(12) United States Patent
Liang

(10) Patent No.: US 6,833,902 B2
(45) Date of Patent: Dec. 21, 2004

(54) STRUCTURE FOR PREVENTING A LIQUID FROM PERMEATING INTO A CELL

(75) Inventor: Gou-Tsau Liang, Taipei (TW)

(73) Assignee: Hannstar Display Corp., Taipei (TW)

( * ) Notice: Subject to any disclaimer, the term of this patent is extended or adjusted under 35 U.S.C. 154(b) by 64 days.

(21) Appl. No.: 10/319,234

(22) Filed: Dec. 13, 2002

(65) Prior Publication Data

US 2003/0197829 A1 Oct. 23, 2003

(30) Foreign Application Priority Data

Apr. 18, 2002 (TW) ........................................ 91108012 A

(51) Int. Cl.$^7$ ............................................ G02F 1/1339
(52) U.S. Cl. ...................... 349/190; 349/153; 349/154
(58) Field of Search ................................ 349/153–154, 349/189–190

(56) References Cited

U.S. PATENT DOCUMENTS 5,464,490 A * 11/1995 Sato et al. .................. 156/145
5,798,813 A * 8/1998 Ohashi et al. ............... 349/154
6,678,029 B2 * 1/2004 Suzuki ........................ 349/154

\* cited by examiner

*Primary Examiner*—Huyen Ngo
(74) *Attorney, Agent, or Firm*—Haverstock & Owens LLP

(57) ABSTRACT

A structure for preventing a liquid from permeating into a cell for facilitating fabrication of a plurality of planels comprising a first substrate having a first exhaust area and a plurality of first portions of the planels, a second substrate having a second exhaust area and a plurality of second portions of the planels, a plurality of orienting films on the plurality of first and second portions of the planels, a plurality of thickening films respectively on the first and the second substrates for narrowing an intermediate distance of the first and second exhaust areas to prevent the liquid from permeating into the cell, a dummy seal around a periphery of the second substrate for preventing the liquid permeating into the cell.

10 Claims, 10 Drawing Sheets

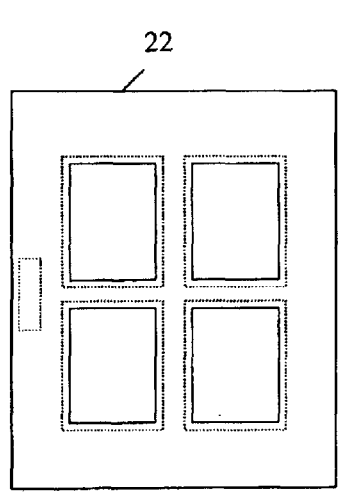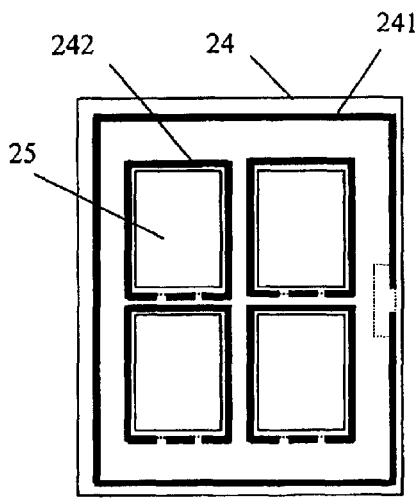
Fig. 2C
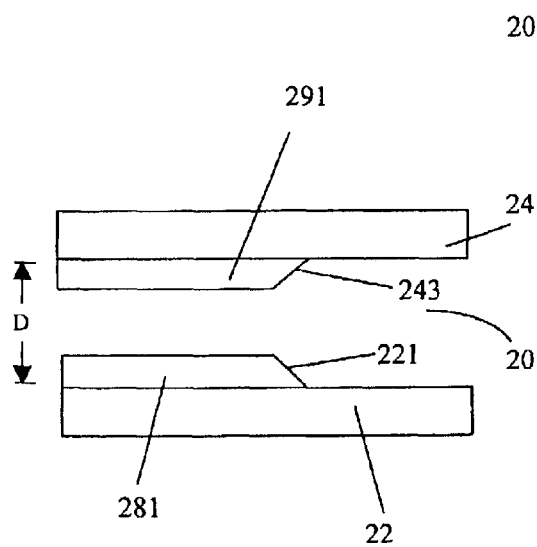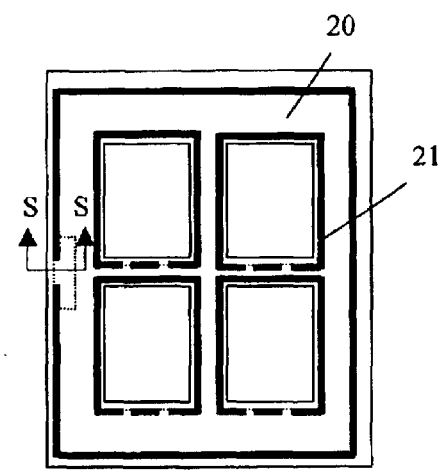
Fig. 2E          Fig. 2D

STRUCTURE FOR PREVENTING A LIQUID FROM PERMEATING INTO A CELL

FIELD OF THE INVENTION

This invention relates to a method for preventing a liquid from permeating, and more particularly to a method for preventing a liquid from permeating into a cell which facilitates fabrication of a plurality of planels.

BACKGROUND OF THE INVENTION

Generally, when a container has to be processed in a liquid without being permeated thereby, a sealing for an outlet of the container is always necessary.

Please refer to FIGS. 1A~1B which illustrate a mechanical sealing method in the prior art. In some conditions, two liquid crystal substrates 10 (it only shows one liquid crystal substrate 10 in FIG. 1A) which are adhered to be opposed in parallel to each other to form a container 12 have to be thinned by a chemical etching or a Chemical Machine Polishing (CMP), thus the container 12 including a cell 11 needs to prevent a liquid 13 (especially a hydrofluoric acid, HF used in the chemical etching) from permeating into the cell 11 (between the two liquid crystal substrates 10). That means a layer or more dummy seal 14 must be coated around a periphery 15 of the substrate 10 for preventing the liquid 13 from permeating thereinto. Further, because a gas inside the container 12 must be exhausted through an exhaust 16 formed by the dummy seal 14 when assembling the two substrates 10, the exhaust 16 will be sealed off by a sealing glue 17 after assembling.

Please refer to FIG. 1C. FIG. 1C illustrates another sealing method for the exhaust 16 of the container 12 according to the prior art. In FIG. 1C, an obstructive seal 18 paralleled to the dummy seal 14 is utilized to form a narrow channel 19 inside the exhaust 16 for blocking and slowing down the liquid 13, so that the time for the liquid 13 to permeate into the cell 11 will be extended. And please further refer to FIG. 1D which illustrates the third sealing method for the exhaust 16 according to the prior art. In FIG. 1D, a long seal 181 is utilized to from an extended channel 191 which will also increase the time for the liquid 13 to permeate into the cell. Thus, the extended channel 191 has a wider width than the narrow channel 19 in FIG. 1C.

However, these three methods described above still have some cons. The first sealing off method will increase the complexity of the whole manufacturing processes. As to the second and third methods, for forming a narrow channel and an extended channel, although these methods can extend the permeation time of the liquid, these will also increase the exhausting time of the gas in the cell at the same time and then reduce the yield. Furthermore, even though these methods are introduced, the liquid will still permeate into the cell.

Because of the defects described above, the applicant keeps on carving unflaggingly to develop "method for preventing liquid from permeating" through wholehearted experience and research.

SUMMARY OF THE INVENTION

It is an object of the present invention to provide a method for preventing liquid from permeating into a cell by printing a thickening film on an exhaust area of a substrate.

It is another object of the present invention to narrow and then increase an intermediate distance of the thickening films printed on the two substrates, so that a surface tension and capillarity will be utilized to resist the liquid to permeate into the cell.

According to an aspect of the present invention, a method for preventing liquid from permeating into a cell for facilitating fabrication of a plurality of planels includes steps of providing a first substrate having a first exhaust area and a plurality of first portions of the planels, providing a second substrate having a second exhaust area and a plurality of second portions of the planels, printing a plurality of orienting films on the plurality of first and second portions of the planels, printing a plurality of thickening films respectively on the first and the second substrates for narrowing an intermediate distance of the first and second exhaust areas to prevent the liquid from permeating into the cell therethrough, coating a dummy seal around a periphery of the second substrate for preventing the liquid permeating into the cell, and assembling the first and the second substrates for forming the cell.

Preferably, the plurality of planels are filled therebetween with a plurality of liquid crystal molecules.

Certainly, the plurality of liquid crystal molecules can be arranged in response to the plurality of orienting films between the plurality of planels.

Preferably, the method further includes a step of coating a frame seal around a periphery of the plurality of planels for filling the plurality of liquid crystal molecules between the plurality of planels.

Preferably, the plurality of thickening films are polymer films.

Preferably, the plurality of orienting films and the plurality of thickening films are made of a polyimide (PI) and are printed on the first and the second substrates.

Preferably, each of the plurality of thickening films has a slant end on an inner side thereof with respect to the cell for gradually increasing an intermediate distance of the plurality of thickening films respectively on the first and the second substrates, so that a surface tension and capillarity are utilized to prevent the liquid from permeating into the cell.

Certainly, the plurality of thickening films and a surface of the liquid can form an included angle $\theta_c$, and a surface on the slant end and a horizontal plane of the plurality of thickening films can form an included angle $\beta$.

Certainly, the included angle $\beta$ can be greater than $(\pi/2 - \theta_c)$.

Preferably, the first and the second substrates are LCD (Liquid Crystal Display) substrates, and the liquid is a HF (hydrofluoric acid) for proceeding a chemical etching process to reduce a weight of the LCD substrate.

Preferably, the first substrate is a TFT (Thin Film Transistor) substrate.

Preferably, the second substrate is a CF (Color Filter) substrate.

In accordance with another aspect of the present invention, a method for preventing a liquid from permeating into a cell for facilitating fabrication of a plurality of planels includes steps of providing a first substrate having a first encircling exhaust area and a plurality of first portions of the planels, providing a second substrate having a second encircling exhaust area and a plurality of second portions of the planels, printing a plurality of polyimides on the plurality of first and second portions of the planels, printing a plurality of encircling thickening films respectively on the first and the second substrates for narrowing an intermediate distance of the encircling exhaust areas to prevent the liquid from permeating into the cell therethrough, and assembling the first and the second substrates for forming the cell.

Preferably, the method further includes a step of coating a frame seal around a periphery of the plurality of planels for filling the plurality of liquid crystal molecules between the plurality of planels.

Preferably, the plurality of encircling thickening films are rectangular circles disposed at the encircling exhaust areas.

Preferably, each of the plurality of encircling thickening films has an inner slant circle thereof with respect to the cell for gradually increasing an intermediate distance of the plurality of thickening films respectively on the first and the second substrates, so that a surface tension and capillarity are utilized to prevent the liquid from permeating into the cell.

Certainly, the plurality of encircling thickening films and a surface of the liquid can form an included angle $\theta_c$, and a surface on the slant circle and a horizontal plane of the plurality of encircling thickening films can form an included angle $\beta$.

Certainly, the included angle $\beta$ can be greater than $(\pi/2-\theta_c)$.

In accordance with a further aspect of the present invention, a structure for preventing a liquid from permeating into a cell with an exhaust outlet includes a first substrate having a plurality of first portions of a plurality of planels, a second substrate having a plurality of second portions of the plurality of planels, a printer for printing a plurality of orienting films on the plurality of first and second portions of the plurality of planels, and two thickening films respectively disposed on the first and the second substrates around the exhaust outlet for narrowing an intermediate distance of the two substrates around the exhaust outlet to prevent the cell from being permeated by the liquid through the exhaust outlet, wherein the first and the second substrates are assembled to form the cell.

Preferably, the method further includes a frame seal coated around the periphery of the plurality of planels for filling the plurality of liquid crystal molecules between the plurality of planels.

Preferably, each the two thickening films has a slant end on an inner side thereof with respect to the cell for gradually increasing an intermediate distance of the two thickening films, so that a surface tension and capillarity are utilized to prevent the liquid from permeating into the cell.

Certainly, the two thickening films and a surface of the liquid can form an included angle $\theta_c$, and a surface on the slant end and a horizontal plane of the two thickening films can form an included angle $\beta$.

Certainly, the included angle $\beta$ can be greater than $(\pi/2-\theta_c)$.

Preferably, the exhaust outlet is an encircling exhaust outlet and the two thickening films are encircling thickening films.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIGS. 2A~2D show the manufacturing processes for preventing the cell from permeating in the first preferred embodiment according to the present invention;

FIG. 2E is a schematic view of the SS cross-section in FIG. 2D;

DETAILED DESCRIPTION OF THE PREFERRED EMBODIMENT

Figure 1A:
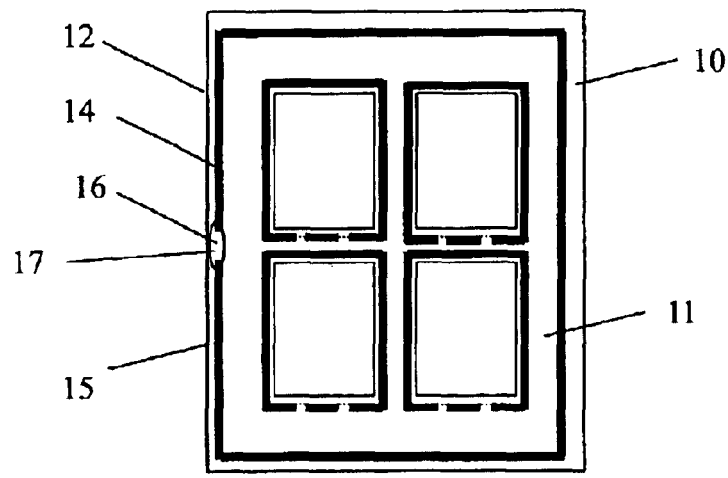
FIG. 1A is a schematic view showing a method for sealing off the exhaust of the liquid crystal substrates in the prior art.
Figure 1B:
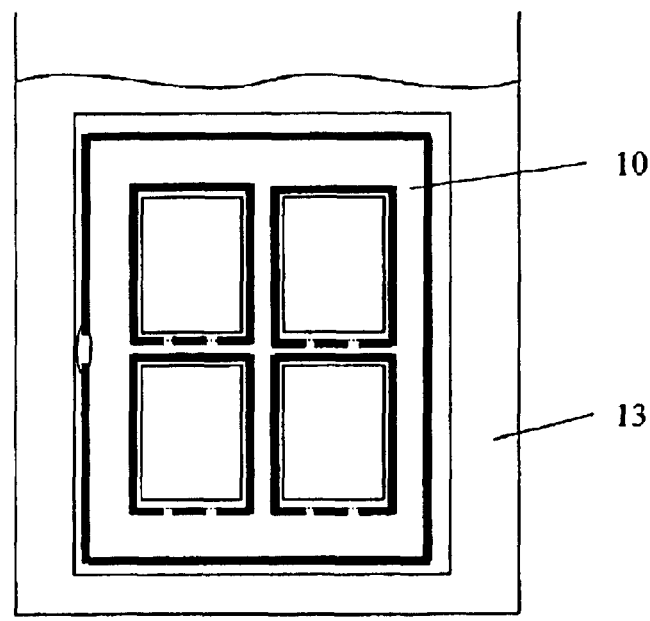
FIG. 1B is a schematic view showing the substrate immersed in HF according to the prior art.
Figure 1C:
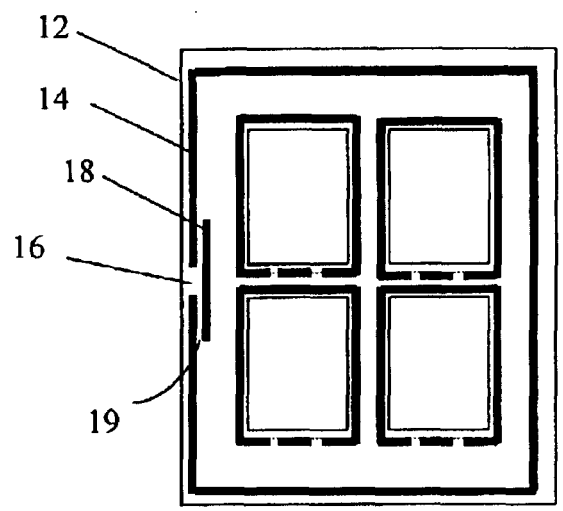
FIG. 1C is schematic view showing a narrow channel inside the exhaust of the substrate according to the prior art.
Figure 1D:
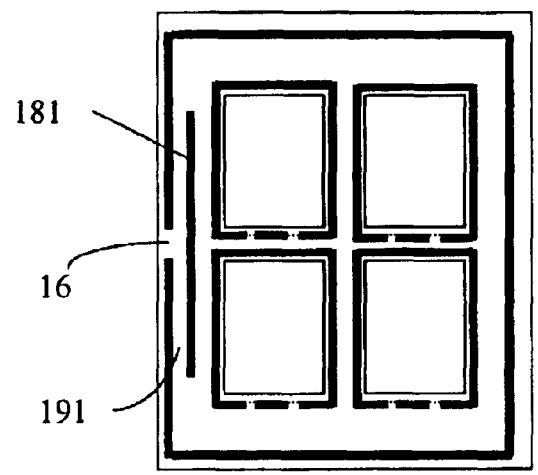
FIG. 1D is a schematic view showing an extended channel inside the exhaust of the substrate according to the prior art.
Figure 2A:
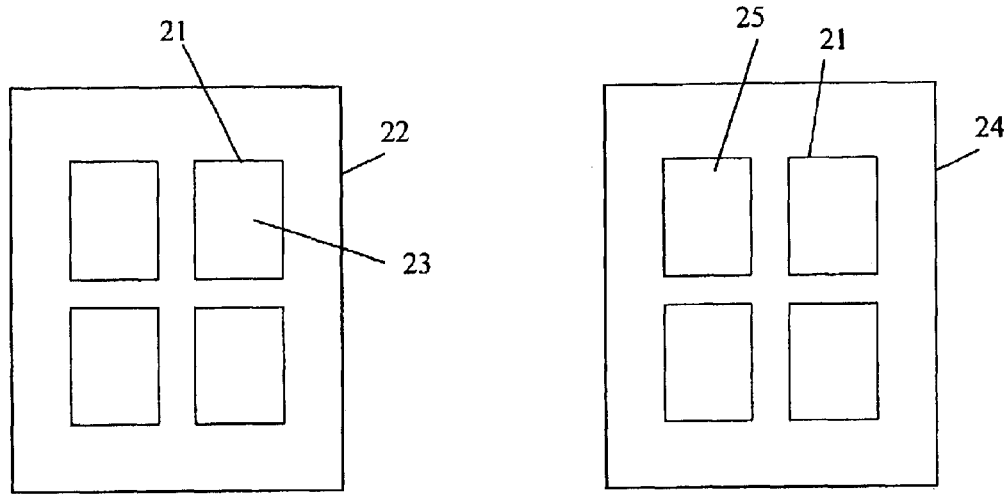
Figure 2B:
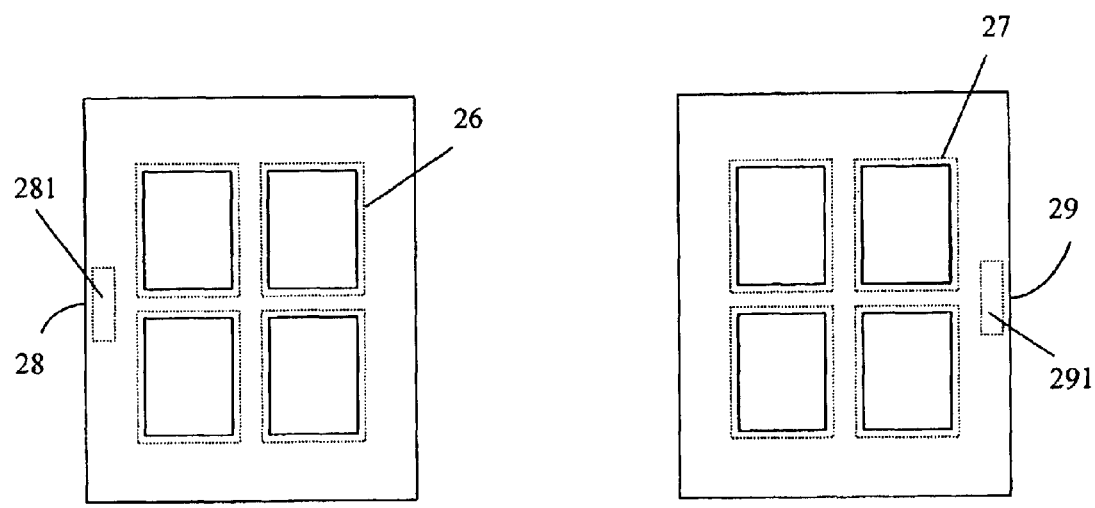

Please refer to FIGS. 2A~2E which illustrate a method for preventing liquid from permeating into a cell for facilitating fabrication of a plurality of planels in the first preferred embodiment according to the present invention. This method includes steps of (a) providing a first substrate 22 having a first exhaust area 28 and first portions 23 of a plurality of planels 21; (b) providing a second substrate 24 having a second exhaust area 29 and second portions 25 of the plurality of planels 21; (c) printing a plurality of orienting films 26, 27 respectively on the first and the second portions 23, 25 of the plurality of planels 21 (as shown in FIG. 2B); (d) printing thickening films 281, 291 respectively on the first and the second exhaust areas 28, 29 (as shown in FIG. 2B) for narrowing an intermediate distance of the exhaust areas to prevent the cell 20 from being permeated by the liquid 13 therethrough; (e) coating a dummy seal 241 (as shown in FIG. 2C) around a periphery of the second substrate 24 for preventing the liquid 13 permeating into the cell 20; and (f) assembling the first and the second substrates 22, 24 for forming the cell 20, wherein the plurality of planels 21 are filled therebetween with liquid crystals, the liquid crystals are arranged in response to thickening films 281, 291 between the plurality of planels 21, and the plurality of orienting films 26, 27 and the thickening films 281, 291 are made of a polyimide (PI) and are all printed on the first and the second substrates 22, 24 by a printer (not shown). Moreover, the method further includes a step (e') of coating a frame seal 242 around the periphery of the second portions 25 of the plurality of planels 21 for filling the liquid crystal between the plurality of planels 21. Furthermore, each of thickening films 281, 291 has a slant end 221, 243 on an inner side thereof with respect to the cell 20 (as shown in FIG. 2E) for gradually increasing the intermediate distance D between the first and the second exhaust areas 28, 29.

Of course, the first and the second substrates 22, 24 can be LCD (Liquid Crystal Display) substrates, and the liquid 13 can be a HF (hydrofluoric acid) for proceeding a chemical etching process to reduce a weight of the glass substrate of LCD. The first substrate 22 is a TFT (Thin Film Transistor) substrate, and the second substrate 24 is a CF (Color Filter) substrate. And, each of the plurality of planels 21 comprises the first and the second portions 23, 25 and the frame seal 242.

Figure 3A:
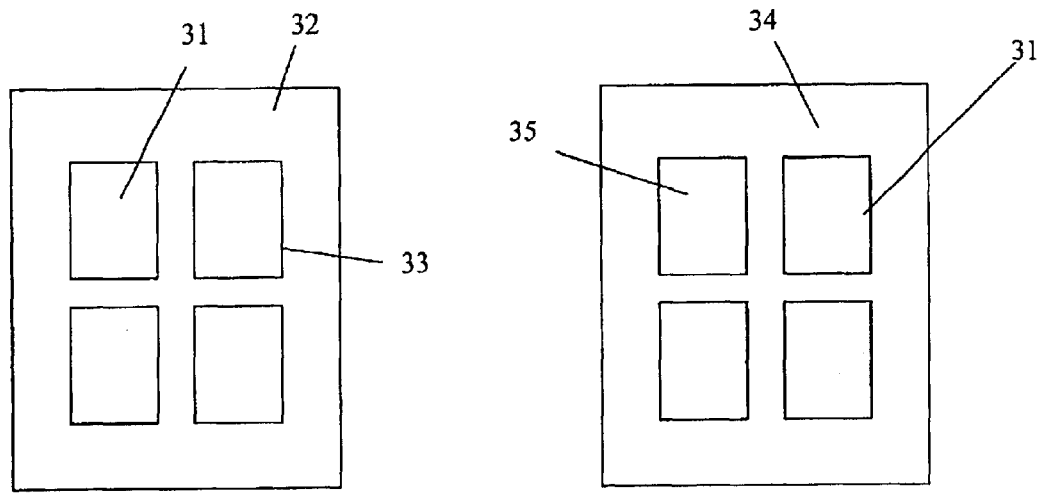
FIGS. 3A~3D show the manufacturing processes for preventing the cell from permeating in the second preferred embodiment according to the present invention.
Figure 3B:
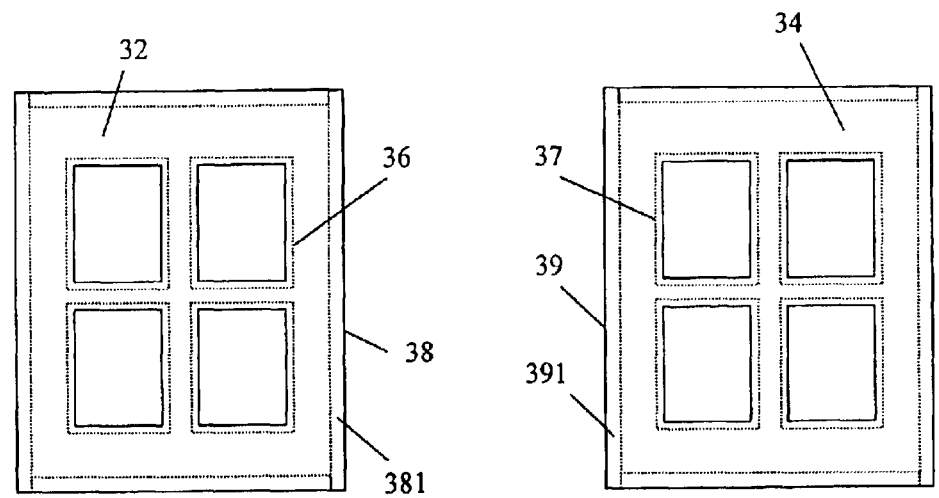
Figure 3C:
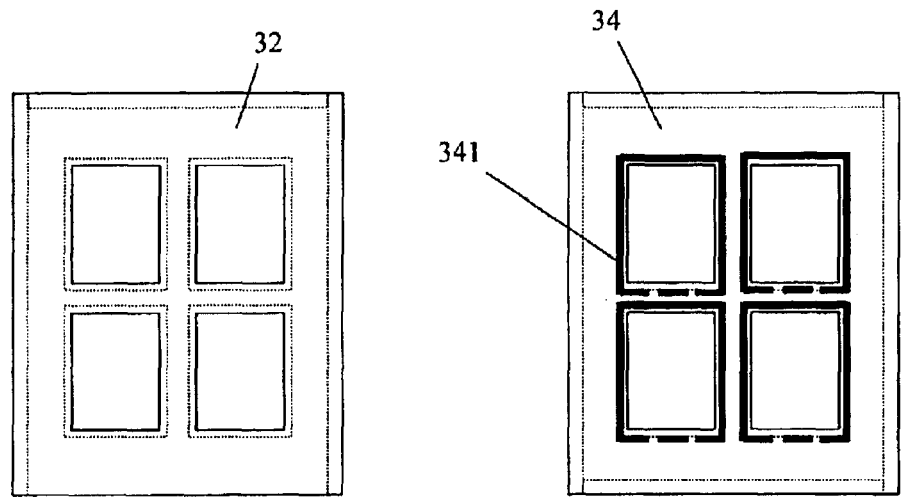
Figures 3D, 3E:
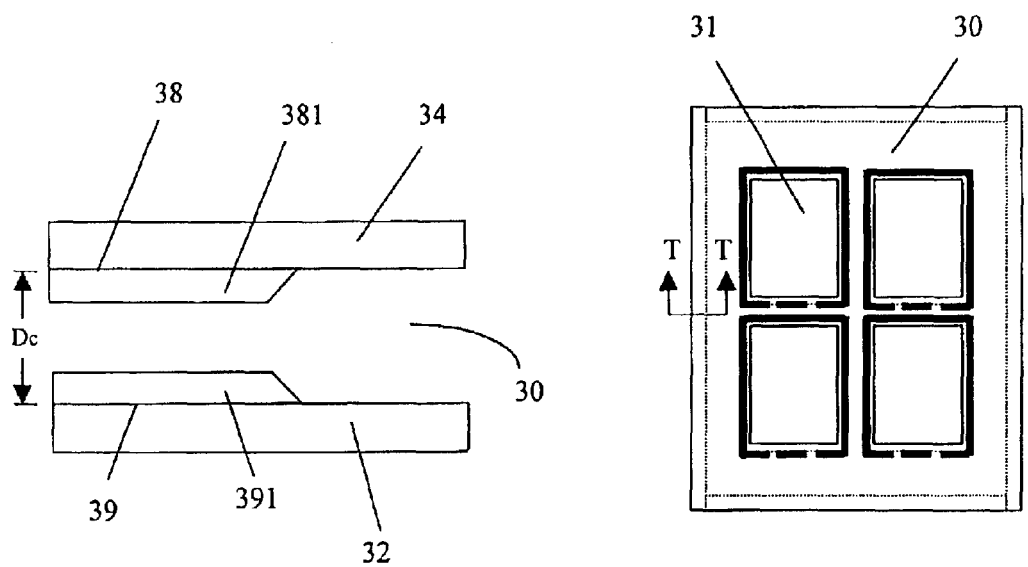
FIG. 3E is a schematic view of the TT cross-section in FIG. 4D.

Please refer to FIGS. 3A~3E. FIGS. 3A~3E illustrate the second preferred embodiment according to the present invention which are the method for preventing a liquid from permeating into a cell for facilitating fabrication of a plurality of planels. In this preferred embodiment, the manufacturing process includes steps of (a) providing a first substrate 32 having a first encircling exhaust area 38 and first portions 33 of a plurality of planels 31; (b) providing a second substrate 34 having a second encircling exhaust area 39 and second portions 35 of the plurality of planels 31; (c) printing a plurality of orienting films 36, 37 respectively on the first and the second portions 33, 35 of the plurality of planels 31 (as shown in FIG. 3B); (d) printing encircling thickening films 381, 391 respectively on the first and the encircling exhaust areas 38, 39 for narrowing an intermediate distance thereof to prevent the cell 30 from being permeated by the liquid 13 therethrough; and (e) assembling the first and the second substrates 32, 34 for forming the cell 30, wherein the plurality of planels 31 are filled therebetween with liquid crystals, the liquid crystals are arranged in response to the encircling thickening films 381, 391 between the plurality of planels 31, and the plurality of orienting films 36, 37 and the encircling thickening films 381, 391 are made of a polyimide (PI) and are all printed on the first and the second substrates 32, 34 by a printer (not shown). In addition, each encircling thickening films 381, 391 is a rectangular circle disposed at the encircling exhaust areas 38, 39 around the periphery of the first and the second substrates 32, 34. Moreover, the method further includes a step (d') of coating a frame seal 341 around the periphery of the second portions 35 of the plurality of planels 31 for filling the liquid crystal between the plurality of planels 31. Furthermore, each of the encircling thickening films 381, 391 has an inner slant circle thereof with respect to the cell for gradually increasing the intermediate distance $D_c$ between the first and the second exhaust areas 38, 39. Consequently, as described above, the dummy seal 241 in FIGS. 2C and 2D are replaced by the encircling thickening films 381, 391 in FIGS. 3B~3D for simplifying the whole manufacturing process.

Figure 4:
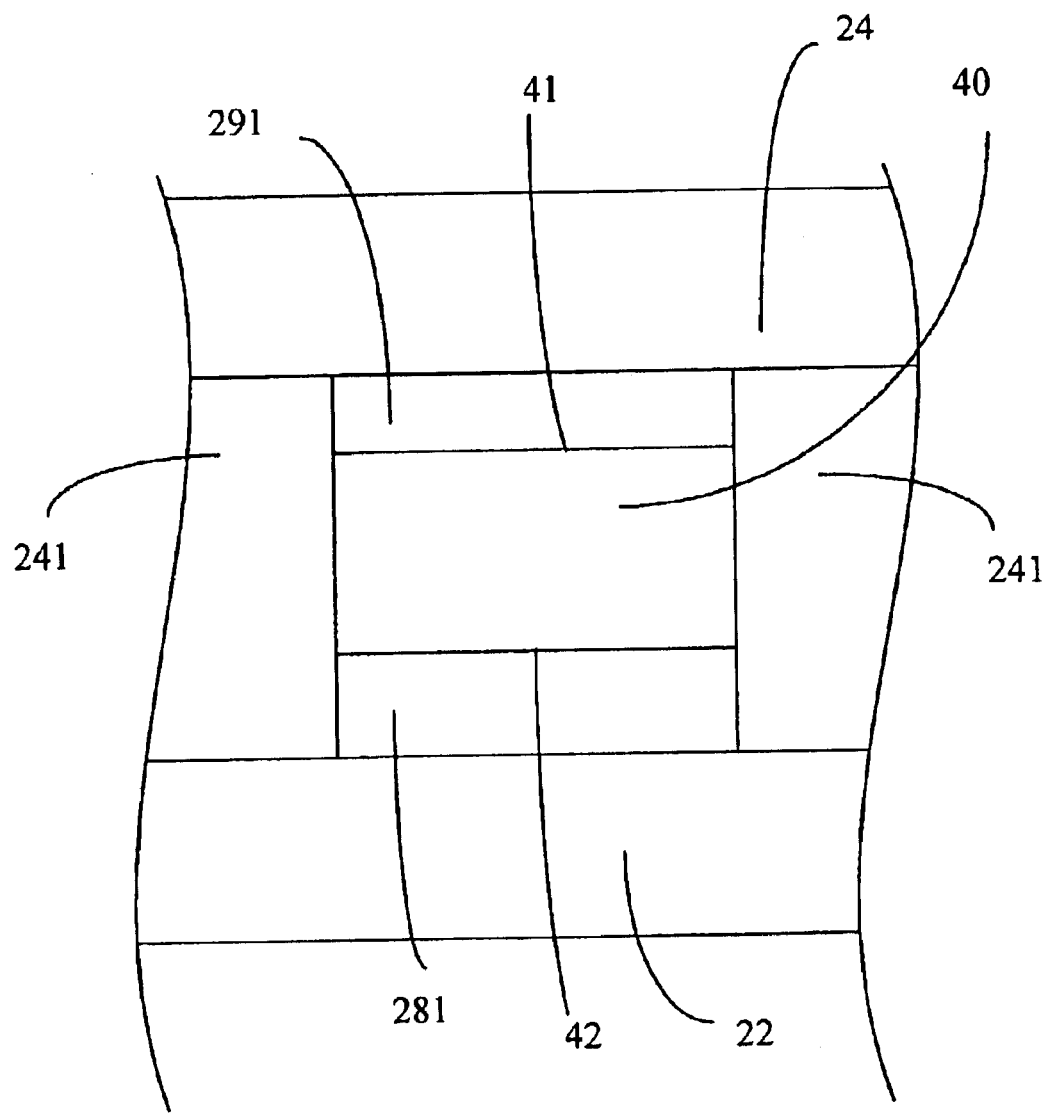
FIG. 4 is the front view of the exhaust in FIG. 2D according to the present invention.

Please refer to FIG. 4 which shows the front view of the exhaust in FIG. 2D according to the present invention. Each of the thickening films 281, 291 has a thickness greater than 300 Å but less than half the distance between two walls 41, 42 of the exhaust outlet 40. However, as shown in FIG. 5, when the thickness of the thickening films is larger than 500 Å, each of the ends 52, 53 opposite to the slant ends 50, 51 of the thickening films 281, 291 can have a thickness lessened to 500 Å.

Figure 5:
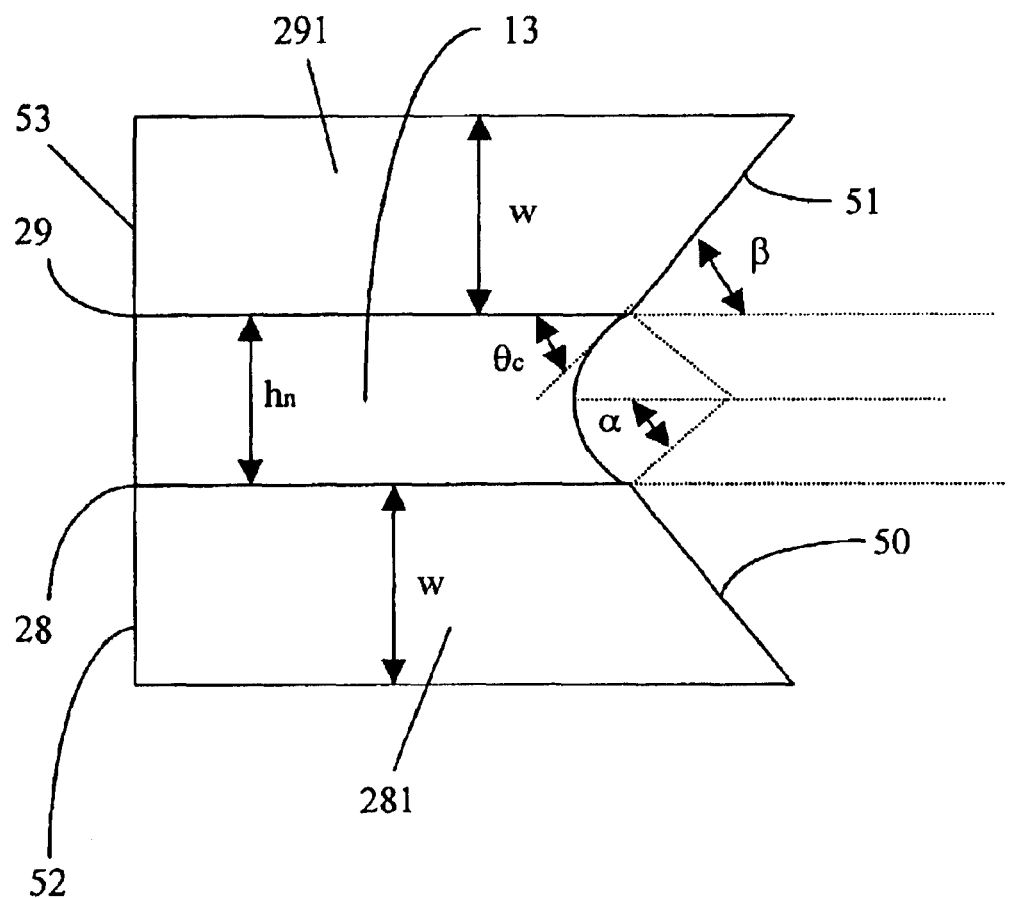
FIG. 5 is the cross-section view of the exhaust to show how the liquid flows into the cell according to the present invention.
Figure 6:
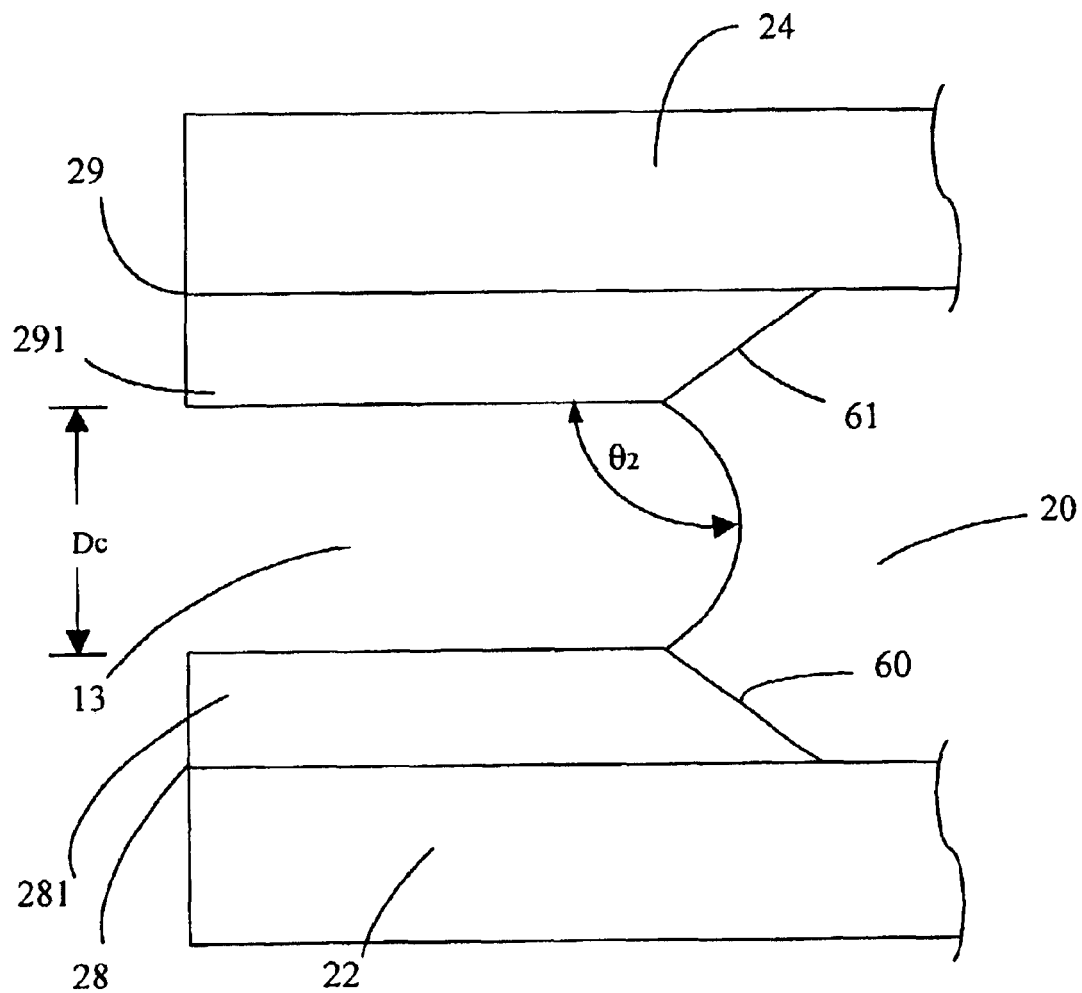
FIG. 6 is the cross-section view of the exhaust to illustrate how the liquid is blocked by the slant ends of the thickening films when the liquid flows into the cell according to the present invention.

Please refer to FIGS. 5 and 6 which show how the liquid flows into the cell (FIG. 5) and how the liquid is blocked by the slant ends of the thickening films (FIG. 6) when the liquid flows into the cell according to the present invention. In FIG. 5, one of the thickening films 281, 291 and a surface of the liquid 13 form an included angle $\theta_c$, and one of the slant ends 50, 51 and a horizontal plane of the thickening films 281, 291 form an included angle β, wherein the included angle β is greater than $(\pi/2-\theta_c)$. Thus, when under this situation shown in FIG. 5, namely $\theta_c$ is smaller than 90°, the liquid 13 will follow the capillarity and flow into the cell. Continuously, please refer to FIG. 6, when the liquid 13 reaches the slant ends 60, 61 of the thickening films 281, 291, because the intermediate distance $D_c$ is suddenly increased owing to the slant ends 60, 61, the $\theta_c$ in FIG. 5 will be altered as $\theta_2$ in FIG. 6, wherein $\theta_2$ is greater than 90°. Thus, when the liquid 13 is under this condition (FIG. 6), the surface tension and capillarity will reach a balance to resist the liquid 13 to further flow into the cell 20. That means the liquid 13 is blocked thereby. In addition, the theory of the present invention describes above can be seen in U.S. Pat. No. 6,143,248 which described the balance of the surface tension and the capillarity.

Figure 7:
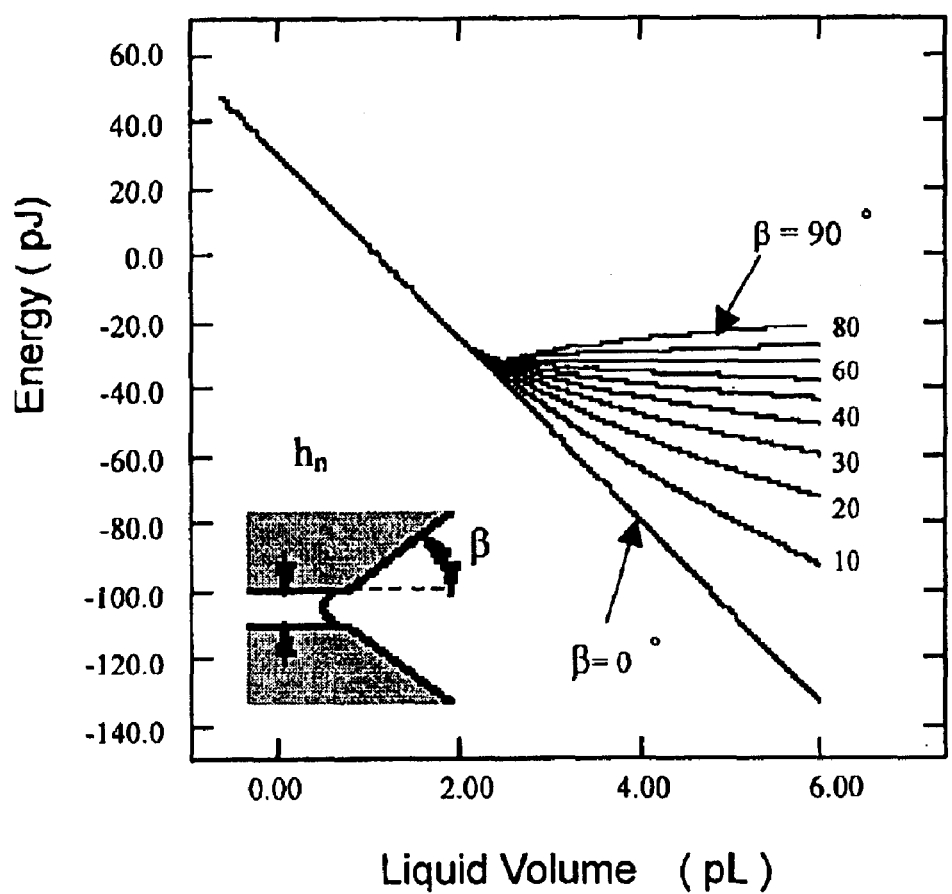
FIG. 7 shows the comparative plot of the angle $\beta$ (in FIG. 5) vs. the liquid volume and the energy at the gas/liquid interface in the first preferred embodiment according to the present invention.

Please refer to FIG. 7 which shows the comparative plot of the angle β (in FIG. 5) vs. the liquid volume and the energy at the gas/liquid interface. Take water as an example, under the conditions that the intermediate distance $h_n$ between the two thickening films is 5 μm, $\theta_c$ is 20°, and w (the thickness of the thickening film) is 100 μm, and the liquid volume (pL) is greater than 2.00 pL, the energy (pJ) at the gas/liquid interface will be increased by the increasing β (the angle β is increased from 0° to 90°). According to the calculation of Man et al. (P. F. Man et al., MENS Conference, 1998), the lowest difference of the pressure (ΔP) for overcoming the resistance (produced by the balance of the surface tension and the capillarity for blocking the liquid to further flow in the cell) is:

$$\Delta P = \frac{2\gamma_{la}}{h_n}\left(\frac{\cos\theta_c - \frac{\alpha}{\sin\alpha}\sin\beta}{\cos\beta + \frac{\sin\beta}{\sin\alpha}\left[\frac{\alpha}{\sin\alpha} - \cos\alpha\right]}\right)$$

Where $h_n$ is the intermediate distance between the two thickening films, $\gamma_{la}$ is the energy at the gas/liquid interface, $\theta_c$ is the included angle of the liquid surface and the thickening film, 2α is the arc angle of the liquid surface, and β is the inclined angle of the slant end of the thickening film.

Thus, in this equation, when $h_n$=5 mm, $\theta_c$=20°, and β=90°, ΔP will be 10 kPa (1.4 m $H_2O$) which is sufficient for resisting the liquid (water) to flow into the container (namely the cell 20).

Consequently, because of the resistance described above, the whole manufacturing process will be simplified by abbreviating the sealing off process at the exhaust areas 28, 29 which is instead by the thickening films with the slant ends, so as to reduce the fabricating time.

Besides, the slant ends of the thickening films may have different slopes and is unnecessary to be symmetrical, and the shape of the exhaust constituted by the thickening films (and the dummy seals) will not be limited. And also, the thickening films can be an encircling one for replacing the dummy seal. Furthermore, because both the thickening films and the dummy seal are hydrophobic, no matter the liquid is hydrophilic or hydrophobic, it will be blocked at the exhaust.

In view of the aforesaid, the present invention provides a new method and structure for preventing the liquid from permeating through the balance of the surface tension and capillarity at the exhaust which has an increasing intermediate distance. And because of this design, the conventional sealing off process can be abbreviated, as well as making a narrow channel and an extended channel. Therefore, the fabrication efficiency of the liquid crystal substrate can be greatly promoted. Consequently, the present invention is suitable for the industrial production, so that it owns the industrial value extremely.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure for preventing a liquid from permeating into a cell having an exhaust outlet, comprising:
    a first substrate having a plurality of first portions of a plurality of planels;
    a second substrate having a plurality of second portions of said plurality of planels;
    a printer for printing a plurality of orienting films on said plurality of first and second portions of said plurality of planels; and
    two thickening films respectively disposed on said first and said second substrates around said exhaust outlet for narrowing an intermediate distance between said two substrates around said exhaust outlet to prevent said cell from being permeated by said liquid through said exhaust outlet,
    wherein said first and said second substrates are assembled to form said cell.

2. A structure according to claim 1, wherein said plurality of planels are filled with a plurality of liquid crystal molecules.

3. A structure according to claim 1, wherein said plurality of liquid crystal molecules are arranged in response to said plurality of orienting films between said plurality of planels.

4. A structure according to claim 1, further comprising a frame seal coated around said periphery of said plurality of planels for filling said plurality of liquid crystal molecules between said plurality of planels.

5. A structure according to claim 1, wherein said two thickening films are two polymer films.

6. A structure according to claim 1, wherein said plurality of orienting films and said two thickening films are made of a polyimide (PI) and are all printed on said first and said second substrates.

7. A structure according to claim 1, wherein each of said two thickening films has a slant end on an inner side thereof with respect to said cell for gradually increasing an intermediate distance between the first and second substrates so that a surface tension and capillarity are utilized to prevent said liquid from permeating into said cell.

8. A structure according to claim 7, wherein said two thickening films and a surface of said liquid form an included angle $\theta_C$, and a surface on said slant end and a horizontal plane of said two thickening films form an included angle $\beta$.

9. A structure according to claim 8, wherein said included angle $\beta$ is greater than $(\pi/2-\theta_C)$.

10. A structure according to claim 1, wherein said exhaust outlet is an encircling exhaust outlet and said two thickening films are encircling thickening films.

* * * * *